United States Patent
Mayer-Wegelin et al.

(10) Patent No.: US 7,895,893 B2
(45) Date of Patent: Mar. 1, 2011

(54) METHOD FOR OPERATING A VIBRATING GYROSCOPE AND SENSOR ARRANGEMENT

(75) Inventors: Raphael Mayer-Wegelin, Friedrichsdorf (DE); Heinz-Werner Morell, Kaiserslautern (DE)

(73) Assignee: VDO Automotive AG, Regensburg (DE)

( * ) Notice: Subject to any disclaimer, the term of this patent is extended or adjusted under 35 U.S.C. 154(b) by 439 days.

(21) Appl. No.: 11/991,943

(22) PCT Filed: Aug. 30, 2006

(86) PCT No.: PCT/EP2006/065815
§ 371 (c)(1),
(2), (4) Date: Mar. 12, 2008

(87) PCT Pub. No.: WO2007/031403
PCT Pub. Date: Mar. 22, 2007

(65) Prior Publication Data
US 2009/0114017 A1    May 7, 2009

(30) Foreign Application Priority Data
Sep. 12, 2005  (DE) .......................... 10 2005 043 560

(51) Int. Cl.
*G01C 19/56* (2006.01)
(52) U.S. Cl. .................................................... 73/504.12
(58) Field of Classification Search ............... 73/504.02, 73/504.12, 504.04, 1.37, 1.77; 702/56, 96
See application file for complete search history.

(56) References Cited

U.S. PATENT DOCUMENTS

| 5,226,321 | A | * | 7/1993 | Varnham et al. | ............ 73/514.02 |
| 5,426,970 | A | * | 6/1995 | Florida et al. | .................. 73/1.37 |
| 5,806,364 | A | | 9/1998 | Kito et al. | |
| 6,029,516 | A | * | 2/2000 | Mori et al. | .................. 73/504.12 |
| 6,282,957 | B1 | * | 9/2001 | Akimoto et al. | ............ 73/504.12 |
| 6,510,737 | B1 | * | 1/2003 | Hobbs | ........................ 73/504.12 |

(Continued)

FOREIGN PATENT DOCUMENTS

DE     40 06 885 C2    10/1990

(Continued)

OTHER PUBLICATIONS

Search Report dated Dec. 5, 2006 for underlying International PCT Application No. PCT/EP2006/065815.

(Continued)

*Primary Examiner* — Helen C. Kwok
(74) *Attorney, Agent, or Firm* — Cohen Pontani Lieberman & Pavane LLP

(57) ABSTRACT

A method for operating a vibrating gyroscope and to a sensor arrangement comprising such a vibrating gyroscope, wherein the vibrating gyroscope is used as a resonator and is part of at least one control circuit that excites the vibration gyroscope by feeding an excitation signal with its natural frequency. An output signal can be tapped from the vibrating gyroscope from which the excitation signal can be derived by filtering and amplification. In accordance with the invention, once a sensor arrangement comprising the vibrating gyroscope is switched on, an initial value for the natural frequency is calculated from a previously measured value of the natural frequency stored in a memory and parameters that effect a modification of the natural frequency since start of the measurement, and the excitation signal is fed to the vibrating gyroscope with the calculated initial value of the frequency.

20 Claims, 1 Drawing Sheet

U.S. PATENT DOCUMENTS

| | | | |
|---|---|---|---|
| 6,564,637 B1 * | 5/2003 | Schalk et al. ............... 73/504.12 |
| 6,698,271 B1 | 3/2004 | Fell et al. |
| 7,062,403 B2 | 6/2006 | Betz et al. |
| 7,190,237 B2 | 3/2007 | Zivanovic et al. |
| 2002/0100322 A1 | 8/2002 | Ebara et al. |

FOREIGN PATENT DOCUMENTS

| | | |
|---|---|---|
| DE | 196 53 577 B4 | 6/1995 |
| DE | 198 52 080 | 8/2000 |
| DE | 102 03 855 B4 | 8/2002 |
| DE | 102 40 087 B4 | 3/2004 |
| EP | 0 307 321 | 3/1989 |
| EP | 0 461 761 B1 | 12/1991 |
| EP | 1 600 732 A1 | 11/2005 |
| JP | 01-032113 | 2/1989 |
| JP | 09-218040 | 8/1997 |
| WO | WO 99/02942 | 1/1999 |
| WO | WO 2004/020948 A1 | 3/2004 |
| WO | WO 2005/001378 A1 | 1/2005 |
| WO | WO 2005/001381 A1 | 1/2005 |
| WO | WO 2005/075939 | 8/2005 |

OTHER PUBLICATIONS

German Office Action dated Sep. 18, 2006 issued in corresponding application No. 10 2005 043 560.2.

* cited by examiner

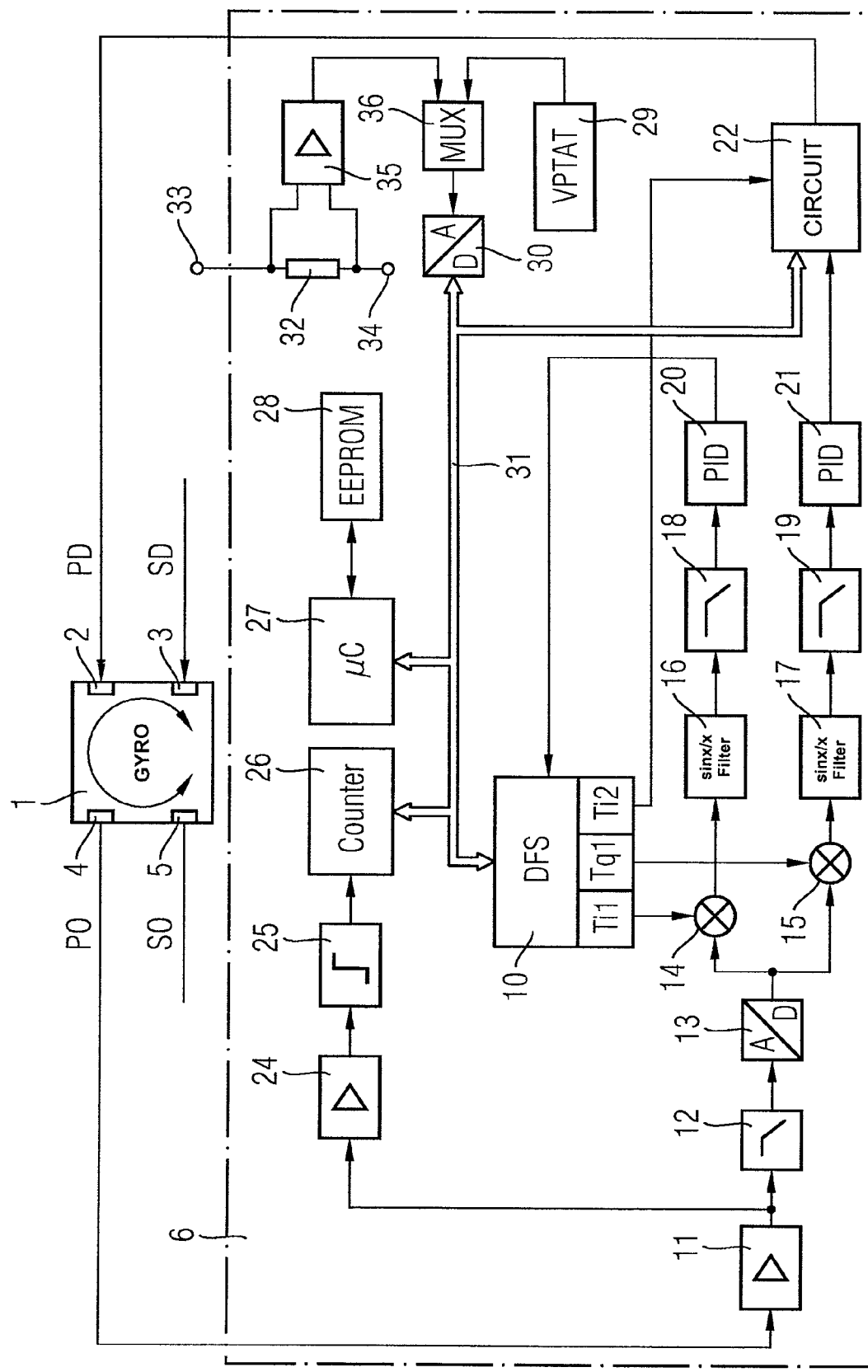

METHOD FOR OPERATING A VIBRATING GYROSCOPE AND SENSOR ARRANGEMENT

CROSS REFERENCE TO RELATED APPLICATIONS

This is a U.S. national stage of application No. PCT/EP2006/065815, filed on Aug. 30, 2006. Priority is claimed on German application No. 10 2005 043 560.2, filed Sep. 12, 2005.

BACKGROUND OF THE INVENTION

The invention relates to a method for operation of a vibration gyro and a sensor arrangement having a vibration gyro, which represents a resonator and forms part of at least one control movement which excites the vibration gyro by supplying an exciter signal at its natural frequency, where an output signal can be tapped off from the vibration gyro and the exciter signal is derived from the output signal by filtering and amplification.

By way of example, EP 0 461 761 B1 discloses rotation rate sensors in which a vibration gyro is excited on two axes which are aligned radially with respect to a major axis, for which purpose a primary and a secondary control loop are provided, with appropriate transducers on the vibration gyro. When rotation rate sensors such as these are used to stabilize the movement of a vehicle, the rotation rate sensor must operate immediately after the vehicle has been started up. However, this stabilization is delayed by the transient response of the secondary control loop.

SUMMARY OF THE INVENTION

It is an object of the present invention to speed up the transient response of a secondary control loop. These and other objects and advantages are achieved in accordance with the invention in that, once a sensor arrangement with the vibration gyro has been switched on, an initial value of the natural frequency is calculated from a previously measured value (stored in a memory) of the natural frequency and from parameters which have resulted in a change in the natural frequency since the measurement. The exciter signal is supplied to the vibration gyro with the calculated initial value of the frequency.

The method in accordance with the invention makes it possible to approximate the initial value sufficiently closely to the actual natural frequency such that an extremely short time is required for stabilization. Here the initial value is preferably calculated from the stored value, its temperature dependency and the temperature measured on switch on. If the temperature of the vibration gyro is not constant during the measurement of the value to be stored, with this measurement normally using an adjustment process during the manufacturing process, the value of the temperature during the adjustment process can also be stored. In many cases, the temperature dependency of the natural frequency is constant. As a result, the need to specifically determine and store the natural frequency during the adjustment process is eliminated. Instead, this value can be written into the memory as a constant value.

In order to accelerate the stabilization process further, one embodiment of the method provides for a phase detector in the control loop to have the output signal applied to it in an initial phase, and phase control is switched on with a delay. In this case, provision is preferably made for gain control to be switched on once the phase control has been switched on.

The contemplated embodiment can be further improved by supplying the exciter signal to the vibration gyro with the maximum permissible amplitude in an initial phase.

In another embodiment of the invention, malfunctions or failures are identified as quickly as possible. This is achieved by calculating a first value of the temperature change with respect to the measurement for monitoring purposes from the difference between the current value of the natural frequency, and a value of the natural frequency which was previously measured during adjustment and stored in a memory, which was measured at a reference temperature, and from the temperature coefficient of the natural frequency. A second value of the temperature change with respect to the measurement is calculated from the difference between the output variables from a temperature sensor at the current temperature and at the reference temperature stored in the memory, and the temperature coefficient of the temperature sensor. In addition, the two calculated values are compared, and an error signal is produced if the discrepancy exceeds a predetermined level.

The contemplated embodiment preferably provides for a correction temperature, which takes account of the change in the thermal conditions since the adjustment of the temperature sensor, and which is included in the calculation.

In an advantageous embodiment, the correction temperature is calculated from the measured power loss of an integrated circuit which contains the temperature sensor, from the power loss measured during adjustment and stored in the memory, and from the thermal resistance of the integrated circuit with respect to the environment.

The sensor arrangement in accordance with the invention has a temperature sensor and a microcontroller, so that no additional complexity of hardware is required to implement the method of the invention. Rather, implementation of the invention may be achieved through software programming.

In the sensor arrangement according to the invention, means are provided to rapidly stabilize the control loop; in that once the sensor arrangement has been switched on, an initial value of the natural frequency is calculated from a previously measured value (stored in a memory) of the natural frequency and from parameters which have resulted in a change in the natural frequency since the measurement, and the exciter signal is supplied to the vibration gyro with the calculated initial value of the frequency.

In an advantageous embodiment of the arrangement, the means preferably comprise a microcontroller with a non-volatile memory and a frequency synthesizer.

In order to monitor the sensor arrangement according to the invention, means can be provided for calculation of a first value of a temperature change from the difference between the current value of the natural frequency, a value of the natural frequency which was previously measured during adjustment and stored in a memory, and was measured at a reference temperature, and from the temperature coefficient of the natural frequency, for calculation of a second value of a temperature change from the difference between the output variables from a temperature sensor at the current temperature and at the reference temperature stored in the memory, and the temperature coefficient of the temperature sensor, for comparison of the two calculated values, and for production of an error signal if the discrepancy exceeds a predetermined level.

BRIEF DESCRIPTION OF THE DRAWINGS

The invention allows numerous embodiments. One of these is illustrated schematically in the drawing and will be described in the following text.

The drawing shows a block diagram of a sensor arrangement with a vibration gyro, with the elements which are used to implement the method in accordance with the invention.

DETAILED DESCRIPTION OF THE EXEMPLARY EMBODIMENTS

The sensor arrangement as well as parts of the arrangement are shown in the form of block diagrams. However, it is not the intention to restrict the sensor arrangement to an implementation based on individual circuits corresponding to these blocks. In fact, the sensor arrangement of the invention can be implemented particularly advantageously using large-scale-integrated circuits. Microprocessors may be used for this purpose which, when suitably programmed, perform the processing steps illustrated in the block diagrams.

The sensor arrangement has a vibration gyro 1 with two inputs 2, 3 for a primary exciter signal PD and a secondary exciter signal SD. The excitation is provided by suitable transducers, for example, electromagnetic transducers. The vibration gyro also has two outputs 4, 5 for a primary output signal PO and a secondary output signal SO. These signals reflect the respective vibration at physically different points on the gyro. Gyros such as these are known, for example, from EP 0 307 321 A1 and are based on the Coriolis force effect.

The vibration gyro 1 represents a high Q-factor filter, with the path between the input 2 and the output 4 being part of a primary control loop 6, and the path between the input 3 and the output 5 being part of a secondary control loop, which is not illustrated, since there is no need to explain it in order to understand the invention. The primary control loop 6 is used to excite oscillations at the resonant frequency of the vibration gyro, for example at 14 kHz. In this case, excitation is produced on one axis of the vibration gyro, with respect to which the oscillation direction used for the secondary control loop is offset through 90°. The signal SO is split in the secondary control loop (not illustrated) into two components, one of which can be tapped off, after suitable processing, as a signal which is proportional to the rotation rate.

The majority of the signal processing in both control loops is performed digitally. The clock signals required for signal processing are produced in a crystal-controlled digital frequency synthesizer 10, whose clock frequency in the illustrated example is 14.5 MHz. In accordance with the invention, the method is performed essentially by using the primary control loop, as a consequence of which FIG. 1 illustrates one exemplary embodiment of the primary control loop.

The control loop has an amplifier 11 for the output signal PO, to which an anti-aliasing filter 12 and an analog/digital converter 13 are connected. Multipliers 14, 15, to which carriers Ti1 and Tq1 are supplied, are used for splitting the output signal into an in-phase component and a quadrature component. The two components then respectively pass through a (sinx/x) filter 16, 17 and a low-pass filter 18, 19. The filtered real part is supplied to a PID regulator 20 which controls the digital frequency synthesizer, thus closing a phase control circuit which results in the phase angles of the carriers Ti1 and Tq1 being correct. Furthermore, a carrier Tq2 is produced and is modulated in a circuit 22 with the output signal from a further PID regulator 21, which receives the low-pass-filtered imaginary part. The output signal from the circuit 22 is supplied to the input 2 of the vibration gyro 1 as the exciter signal PD. Depending on the specific preconditions, other regulators, for example PI regulators, may also be provided instead of the PID regulators.

A microcontroller 27 that is provided to implement the method of the invention, controls the individual steps of the method of the invention and has access to a non-volatile memory 28 which is in the form of EEPROM. Furthermore, a temperature sensor, which is provided for many circuit arrangements and comprises an actual sensor 29 and an analog/digital converter 30, is used for the method of the invention. A bus system 31 connects the described components to one another and to the digital frequency synthesizer 10, as well as to the circuit 22.

The initial value is calculated in a simple form using the equation $F_{0Ta}=(V_{TA}-V_{RT})/T_{Cv} \times T_{Cf0}+F_{0RT}$. In this case, $F_{0Ta}$ is the natural frequency of the vibration gyro at the temperature measured by the temperature sensor 29, i.e., the initial value, and $F_{0RT}$ is the natural frequency measured at room temperature during the adjustment process, and stored in the memory 28. $T_{Cv}$ is the temperature coefficient of the temperature sensor 29, while $T_{Cf0}$ represents the temperature coefficient of the natural frequency of the vibration gyro. $V_{TA}$ and $V_{RT}$ are the two output voltages from the temperature sensor 29 at the temperature on switch on, and at the temperature during adjustment, as stored in the memory 28.

Once the initial value has been calculated, the microcontroller 27 sets the frequency synthesizer 10 to produce an exciter signal with the initial value as the frequency. At this stage, the control loop has not yet been closed, for example, by interrupting the clocks Ti1 and Tq1. As soon as the vibration gyro has received the exciter signal, the control loop is closed. More precisely all the phase control loops are first closed, followed by the gain control.

For monitoring purposes, from time-to-time during operation these variables are read from the memory 28 and compared with the respective current natural frequency, while taking into account the current temperature (output voltage $V_{TA}$) measured by the sensor 29. The comparison process is based, for example, on the following equations:

$$T_{adelta1}=(F_{0TA}-F_{0RT})/T_{CF0}$$

$$T_{adelta2}=(V_{TA}-V_{RT})/T_{Cv}$$

In this case, $T_{adelta2}$ is the temperature change determined by the temperature sensor, $T_{adelta1}$ is the temperature change determined from the change in the frequency, $T_{Cv}$ is the temperature coefficient, stored in the memory, of the temperature sensor 29, $F_{0TA}$ is the current frequency, $F_{0RT}$ is the frequency stored in the memory, and $T_{CF0}$ is the temperature coefficient, likewise stored in the memory, of the natural frequency of the vibration gyro.

The current value of the natural frequency can be obtained from the respective setting of the divider for the digital frequency synthesizer 10 and its clock frequency. However, it is also possible to calculate the current value using a frequency measurement device which comprises a further amplifier 24, a Schmitt trigger 25 and a counter 26.

Ideally, $T_{adelta1}$ and $T_{adelta2}$ are the same; if any difference assumes values which exceed a predetermined level, the presence of one of a plurality of possible faults can be deduced and, for example, a fault can be signaled in the form of the activation of a warning lamp, or can be stored in the memory to be available for subsequent diagnostic purposes.

In order to take into account of any power loss that differs from that during the adjustment process in the circuit which contains at least the primary control loop 6, the current drawn I of the circuit is measured using a measurement resistor 32 whose resistance is R. The operating voltage U for the circuit is supplied to a connection 33, and is distributed via a circuit point 34 to the various components. The voltage drop $U_i$ across the measurement resistor 32 is amplified by a factor v in an amplifier 35 and is supplied via a multiplexer 36 to the analog/digital converter 30. The microcontroller 27 then calculates the power loss using the equation $P=U*I = U*U_1/R*v$). During the adjustment process, the power loss $P_{RT}$ and the associated ambient temperature $T_{RT}$ are stored in the memory. The power loss calculated during operation is referred to in the following text as $P_A$.

This can be used to calculate a correction temperature, specifically in the form $T_{cor}=T_{RT}+(P_A-P_{RT})*R_{TH}$, where $R_{TH}$ represents the thermal resistance between the circuit and the environment. The equation mentioned above is therefore supplemented to calculate $T_{adelta2}$:

$$T_{adelta2cor}=T_{adelta2}-T_{cor}$$

As already mentioned above, a fault signal can be emitted in the event of inequality, specifically when:

$$T_{adelta1} \neq T_{adelta2cor}.$$

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operation of a vibration gyro, which includes a resonator and forms part of at least one control loop which supplies an exciter signal at a natural frequency to excite the vibration gyro, wherein an output signal is tapable from the vibration gyro and the exciter signal is derived from said output signal by filtering and amplification, the method comprising:
    calculating an initial value of the natural frequency from a previously measured value, which is stored in a memory, of the natural frequency and from parameters which resulted in a change in the natural frequency since measurement of the previously measured value, once a sensor arrangement having the vibration gyro has been switched on; and
    supplying the exciter signal to the vibration gyro at the calculated initial value of the natural frequency.

2. The method as claimed in claim 1, wherein the initial value is calculated from the stored value, a temperature dependency of the natural frequency, and a temperature measured at the time the vibration gyro is switch on.

3. The method as claimed in claim 1, further comprising:
    applying the output signal to a phase detector in the control loop at the initial value; and
    switching on a phase control with a delay.

4. The method as claimed in claim 2, further comprising:
    applying the output signal to a phase detector in the control loop at the initial value; and
    switching on a phase control with a delay.

5. The method as claimed in claim 3, wherein a gain control is switched on after the phase control has been switched on.

6. The method as claimed in claim 3, further comprising:
    supplying the exciter signal to the vibration gyro at a maximum permissible amplitude in an initial phase.

7. The method as claimed in claim 1, further comprising:
    calculating a first value of a temperature change with respect to a measurement for monitoring purposes from a difference between a current value of the natural frequency, and the value of the natural frequency which was previously measured during adjustment and stored in the memory, and was measured at a reference temperature, and from a temperature coefficient of the natural frequency;
    calculating a second value of the temperature change with respect to the measurement from the difference between output variables from a temperature sensor at a current temperature and at the reference temperature stored in the memory, and the temperature coefficient of the temperature sensor;
    comparing the first calculated value and the second calculated value; and
    producing an error signal if a discrepancy between the first and second calculated values exceeds a predetermined level.

8. The method as claimed in claim 7, wherein the step of comparing uses a correction temperature which takes account of the change in the thermal conditions since the adjustment of the temperature sensor.

9. The method as claimed in claim 8, wherein the correction temperature is calculated from a measured power loss of an integrated circuit which contains a temperature sensor, the power loss measured during adjustment and stored in the memory, and from a thermal resistance of the integrated circuit with respect to the environment.

10. A sensor arrangement, comprising:
    a vibration gyro which includes a resonator and forms part of at least one control loop which supplies an exciter signal at a natural frequency to excite the vibration gyro, wherein an output signal is tapable from the vibration gyro and the exciter signal is derived from said output signal by filtering and amplification; and
    means for rapidly stabilizing the control loop once the sensor arrangement has been switched on, an initial value of the natural frequency being calculated from a previously measured value, which is stored in a memory, of the natural frequency and from parameters which have resulted in a change in the natural frequency since measurement of the previously measured value, and the exciter signal being supplied to the vibration gyro at the calculated initial value of the natural frequency.

11. The sensor arrangement as claimed in claim 10, wherein the means for stabilizing comprise a microcontroller with a non-volatile memory and a frequency synthesizer.

12. The sensor arrangement as claimed in claim 10, wherein the initial value is calculated from the stored value, a temperature dependency of the natural frequency, and a temperature measured when the vibration gyro is switched on.

13. The sensor arrangement as claimed in claim 11, wherein the initial value is calculated from the stored value, a temperature dependency of the natural frequency, and the temperature measured when the vibration gyro is switched on.

14. The sensor arrangement as claimed in claim 10, wherein the output signal is applied to a phase detector disposed in the control loop in an initial phase, and a phase control is switched on with a delay.

15. The sensor arrangement as claimed in claim 14, wherein a gain control is switched on after the phase control has been switched on.

16. The sensor arrangement as claimed in claim 13, wherein the exciter signal is supplied to the vibration gyro at a maximum permissible amplitude in an initial phase.

17. The arrangement as claimed in claim 10, wherein, in order to monitor the sensor arrangement, means are provided for calculation of a first value of a temperature change from a difference between a current value of the natural frequency, and a value of the natural frequency which was previously measured during adjustment and stored in the memory, and was measured at a reference temperature, and from a temperature coefficient of the natural frequency, for calculation of a second value of a temperature change from the difference between the output variables from a temperature sensor at a current temperature and at the reference temperature stored in the memory, and the temperature coefficient of the temperature sensor, for comparison of the first calculated value and the second calculated value, and for production of an error signal if a discrepancy between the first and second calculated values exceeds a predetermined level.

18. The arrangement as claimed in claims 17, wherein that the means comprise a microcontroller with a non-volatile memory.

19. The arrangement as claimed in claim 17, further comprising:
means which include a correction temperature in the calculation, which correction temperature takes into account changes in thermal conditions since the adjustment of the temperature sensor.

20. The arrangement as claimed in claim 19, further comprising:
means for calculating the correction temperature from a measured power loss of an integrated circuit which contains a temperature sensor, from the power loss measured during adjustment and stored in the memory, and from a thermal resistance of the integrated circuit with respect to the environment.

* * * * *